US012623625B1

(12) United States Patent
Kang

(10) Patent No.: US 12,623,625 B1
(45) Date of Patent: May 12, 2026

(54) CURTAIN AIRBAG DEVICE

(71) Applicant: HYUNDAI MOBIS CO., LTD., Seoul (KR)

(72) Inventor: Dong Ho Kang, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/251,956

(22) Filed: Jun. 27, 2025

(30) Foreign Application Priority Data

Nov. 14, 2024 (KR) ........................ 10-2024-0161974

(51) Int. Cl.
*B60R 21/232* (2011.01)
*B60R 21/213* (2011.01)

(52) U.S. Cl.
CPC .......... *B60R 21/232* (2013.01); *B60R 21/213* (2013.01)

(58) Field of Classification Search
CPC ............................ B60R 21/232; B60R 21/213
See application file for complete search history.

(56) References Cited

U.S. PATENT DOCUMENTS

| | | | | |
|---|---|---|---|---|
| 8,056,924 | B2 * | 11/2011 | Hatfield | ................ B60R 21/213 |
| | | | | 280/730.2 |
| 8,240,701 | B2 * | 8/2012 | Cheal | .................... B60R 21/201 |
| | | | | 280/730.2 |
| 8,727,371 | B2 * | 5/2014 | Ochiai | ................ B60R 21/2176 |
| | | | | 280/730.2 |
| 9,487,175 | B2 * | 11/2016 | Noma | .................... B60R 21/214 |
| 11,745,690 | B2 * | 9/2023 | Kim | ...................... B60R 21/232 |
| | | | | 280/728.2 |
| 2007/0063490 | A1 | 3/2007 | Minamikawa | |
| 2016/0159308 | A1 | 6/2016 | Choi | |
| 2022/0355757 | A1 | 11/2022 | Kim | |
| 2025/0296525 | A1 * | 9/2025 | Kato | .................... B60R 21/237 |

FOREIGN PATENT DOCUMENTS

| | | | | |
|---|---|---|---|---|
| JP | 2002-053005 A | | 2/2019 | |
| KR | 20210157011 A | * | 12/2021 | ........... B60R 21/201 |
| WO | WO-2014014191 A1 | * | 1/2014 | ........... B60R 21/213 |

OTHER PUBLICATIONS

KR-20210157011-A (machine translation) (Year: 2021).*
Extended European Search Report dated Nov. 19, 2025, issued in corresponding European patent application No. EP 25187475.6.

* cited by examiner

*Primary Examiner* — Jason D Shanske
*Assistant Examiner* — Joselynn Y Sliteris
(74) *Attorney, Agent, or Firm* — Novo TechIP International PLLC

(57) ABSTRACT

An embodiment discloses a curtain airbag device including an airbag cushion that includes a cushion main body and a tab strap which wraps around the cushion main body and binds the cushion main body to maintain a folded shape, and a ramp that is mounted on a roof rail of a vehicle through a fastening member and on which the airbag cushion is placed and supported, wherein the fastening member is coupled to a coupling hole formed in the ramp while not connected to the airbag cushion so as to fix the ramp to the roof rail.

9 Claims, 8 Drawing Sheets

CURTAIN AIRBAG DEVICE

CROSS-REFERENCE TO RELATED APPLICATIONS

The present application claims priority to and the benefit under 35 USC § 119 of Korean Patent Application No. 10-2024-0161974, filed on Nov. 14, 2024, in the Korean Intellectual Property Office, the entire disclosure of which is incorporated herein by reference in its entirety for all purposes.

TECHNICAL FIELD

The present invention relates to a curtain airbag device, and more specifically, to a curtain airbag device capable of protecting an occupant in the event of a vehicle collision.

BACKGROUND

Vehicles are equipped with various airbags to protect occupants from collisions. Among these airbags, curtain airbags protect occupants from an impact or fragments generated from a side of a vehicle in the event of a vehicle collision.

Such a curtain airbag extends along a roof rail of a vehicle body and is mounted to the roof rail via tabs provided in the curtain airbag. Here, the curtain airbag is installed on a vehicle body side by fastening the tabs to the vehicle body with bolts and washers.

However, since the tabs are made of a soft fabric, the tabs sag due to the load of the curtain airbag even when the tabs are bolted to the vehicle body. In addition, when an external force is applied to the tabs, deformation or tearing of the tabs occurs, which causes left-right movement of the curtain airbag, resulting in problems such as reduced assembly efficiency in fixing the curtain airbag to the vehicle body and thus reduced productivity.

Meanwhile, a method of bolting a plate-shaped bracket together with a tab as one piece is being introduced, but due to a strong force generated when a cushion is deployed, the tab is pulled and an external force is applied to a bolt, which causes the tab to be torn and separated from the curtain airbag, or the bolt to be separated from the bracket and damage the bracket, causing fragments to fly. Therefore, there is a need to improve this.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to a curtain airbag device of which deformation is prevented and assembly efficiency is improved by improving a mounting structure of a curtain airbag.

Objects of the present invention are not limited to the object described above, and other objects that are not described will be clearly understood by those skilled in the art from the description below.

According to an aspect of the present invention, there is provided a curtain airbag device including an airbag cushion that includes a cushion main body and a tab strap which wraps around the cushion main body and binds the cushion main body to maintain a folded shape, and a ramp that is mounted on a roof rail of a vehicle through a fastening member and on which the airbag cushion is placed and supported, wherein the fastening member is coupled to a coupling hole formed in the ramp while not connected to the airbag cushion so as to fix the ramp to the roof rail.

The tab strap may include a strap portion that wraps around the cushion main body folded in a roll shape and a mounting tab portion that extends through the strap portion and is connected to the ramp, and the mounting tab portion may be provided with a coupling ring to be fitted onto the ramp at an end portion thereof.

At an upper end of the cushion main body, the mounting tab portion may be disposed to extend toward a lower end of the cushion main body, and the strap portion may be disposed to extend in a direction opposite to the mounting tab portion.

The strap portion may have an opening through which the mounting tab portion passes, and the mounting tab portion may pass through the opening and may be tightened such that the tab strap binds the cushion main body.

The ramp may include a support portion on which the airbag cushion is placed and a fixing portion that extends upward from an upper end of the support portion, and the fixing portion may be inserted to pass through the coupling ring and coupled to the mounting tab portion.

The coupling hole may be formed to pass through the fixing portion, and the coupling hole may be disposed above the coupling ring in a state in which the fixing portion is inserted into the coupling ring.

The support portion includes a first part that is continuously connected to the fixing portion and extends vertically, and a second part that extends forward from a lower end of the first part, and the fixing portion may be provided on each of opposite edges of the first part in a longitudinal direction.

The ramp may further include a cover portion that is disposed on the airbag cushion in a state in which the airbag cushion is placed on the support portion.

The cover portion may extend forward from the upper end of the support portion and accommodate the airbag cushion between the cover portion and the support portion.

The curtain airbag device may further include a fixing strap that integrally wraps around the ramp and the airbag cushion in a state in which the airbag cushion is disposed in the ramp, wherein the fixing strap may be configured to break when the airbag cushion is deployed.

Figure 1:
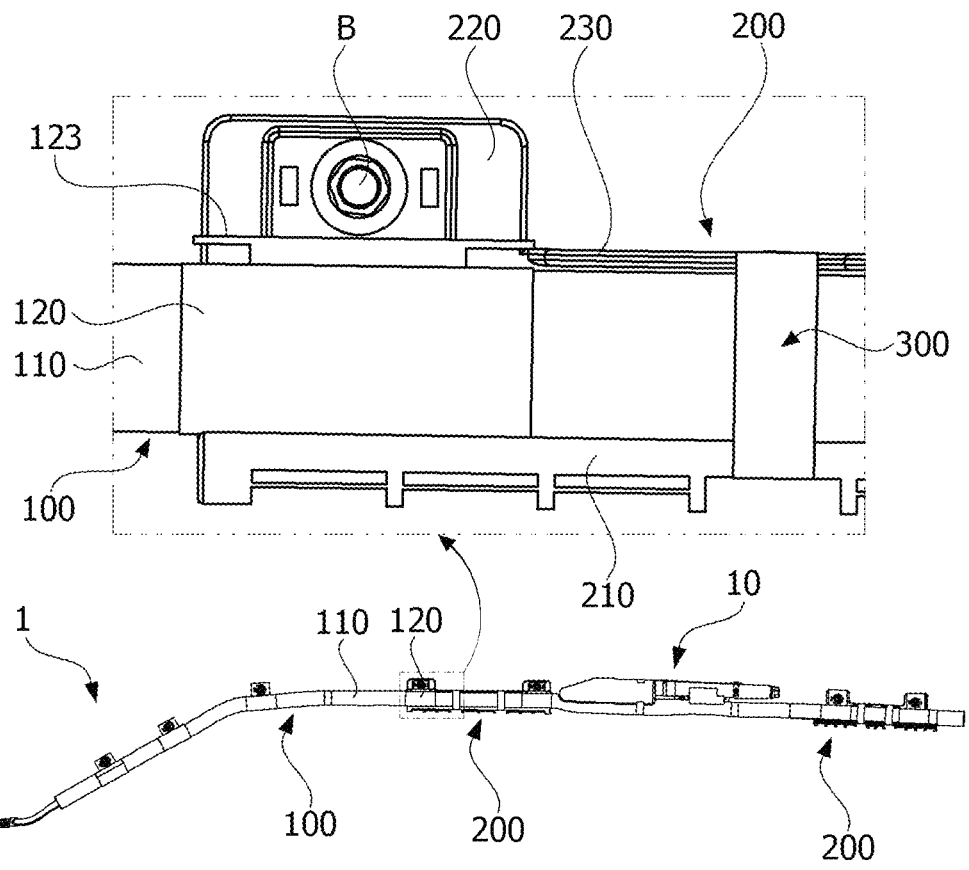
FIG. 1 is a view showing a curtain airbag device according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIGS. 1 to 8 show a curtain airbag device and components thereof according to embodiments of the present invention.

A curtain airbag device 1 according to embodiments of the present invention may extend in a front-rear direction of a vehicle in upper portions of a front door and a rear door (not shown) of the vehicle and may be installed on a roof rail of the vehicle. The curtain airbag device 1 may be connected to an inflator 10 that generates gas.

Referring to the drawings, the curtain airbag device 1 according to the embodiment of the present invention may include an airbag cushion 100 and a ramp 200.

The airbag cushion 100 may have a shape extending in the front-rear direction of the vehicle and may be folded in a roll shape and provided. The airbag cushion 100 may include a cushion main body 110 and a tab strap 120.

The cushion main body 110 may be configured to form a cushion for protecting the head and upper body of an occupant and have a shape extending in the front-rear direction of the vehicle.

In the event of a vehicle collision, the cushion main body 110 is deployed downward while being inflated by the gas generated from the inflator 10 and is disposed between the occupant and the door to protect the occupant.

The cushion main body 110 may be made of a flexible fabric material. Additionally, the cushion main body 110 may be made of a synthetic fiber material, but the material is not limited thereto.

Figure 2:
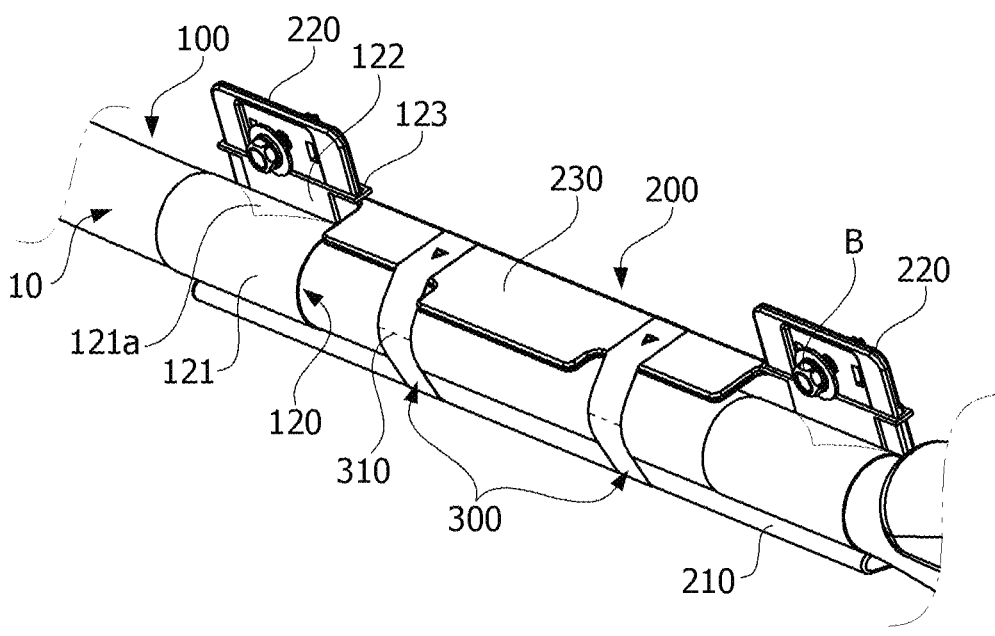
FIG. 2 is a view showing a curtain airbag device in which an airbag cushion and a ramp are bound according to an embodiment.
Figure 3:
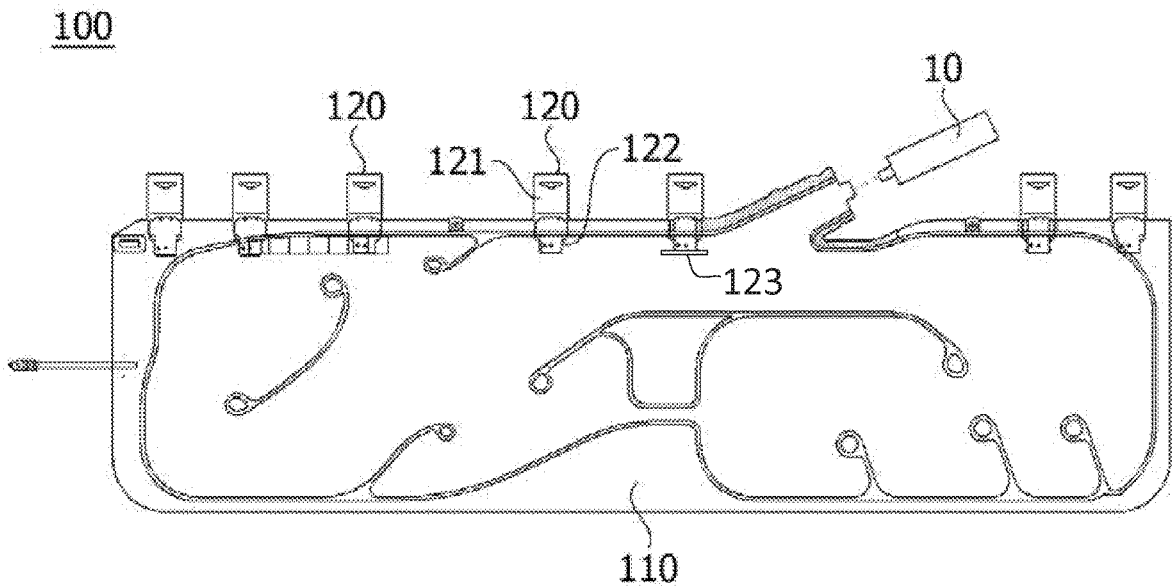
FIG. 3 is a view showing the airbag cushion in the curtain airbag device.
Figure 4:
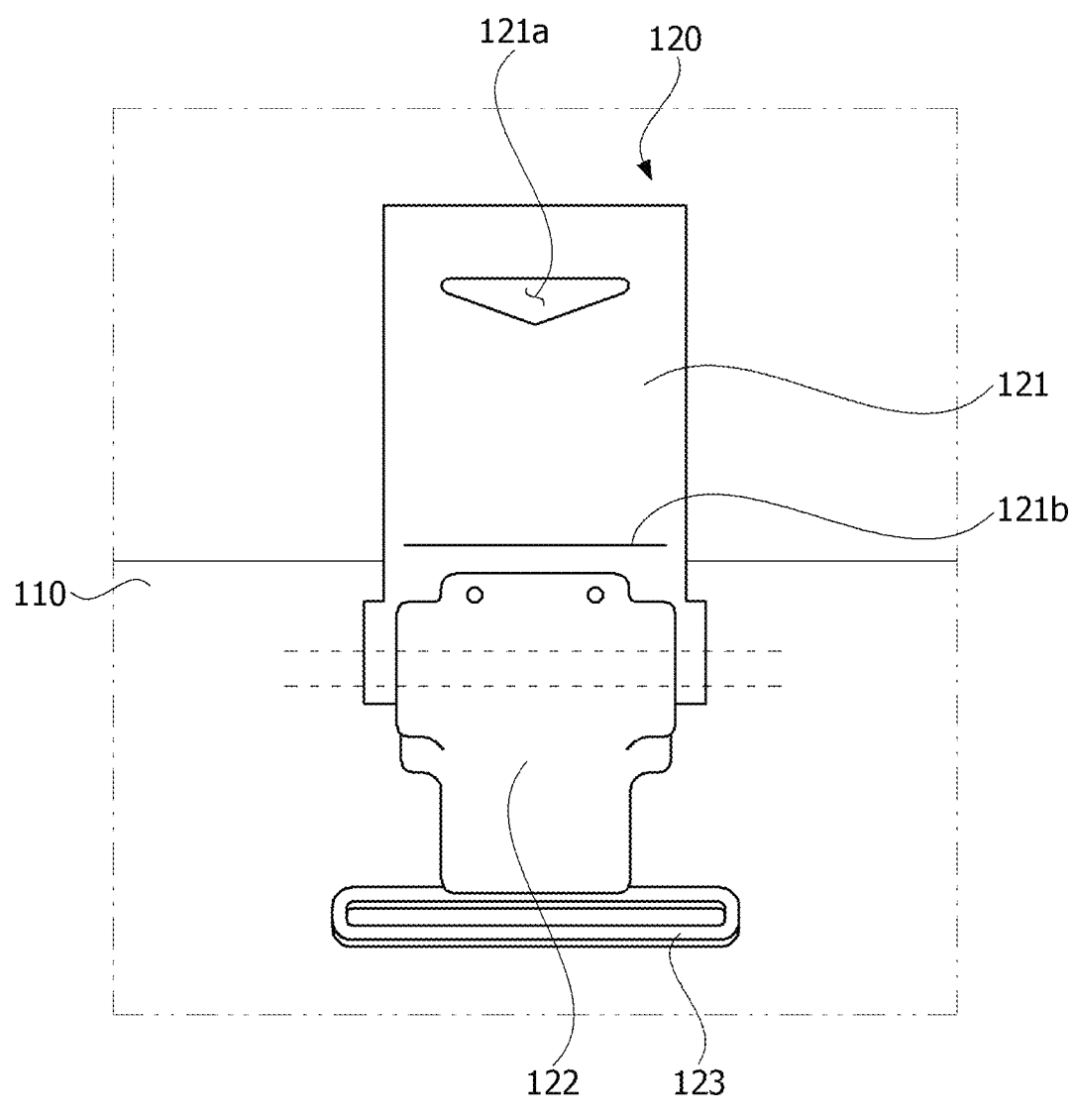
FIG. 4 is a view showing a tab strap in the airbag cushion.

As shown in FIGS. 2 to 4, the tab strap 120 may wrap around the cushion main body 110 folded in a roll shape and bind the cushion main body 110 to maintain the folded shape. The tab strap 120 may be provided as a plurality of tab straps on an upper end of the cushion main body 110 and arranged at set intervals in a longitudinal direction of the cushion main body 110.

The tab strap 120 may include a strap portion 121 that wraps around the cushion main body 110 folded in a roll shape and a mounting tab portion 122 that extends through the strap portion 121 and is connected to the ramp 200.

The strap portion 121 may be disposed in a structure in which one end portion thereof is joined to the cushion main body 110 at the upper end of the cushion main body 110 and the strap portion 121 extends upward from the upper end of the cushion main body 110. The strap portion 121 may have an opening 121*a*, through which the mounting tab portion 122 extends or passes, at the other end portion thereof that extends. Additionally, the strap portion 121 may be provided with a tear line 121*b* that is broken by a deploying pressure of the cushion main body 110.

The mounting tab portion 122 may be disposed in a structure in which one end portion thereof is joined to the strap portion 121 at the upper end of the cushion main body 110 and the mounting tab portion 122 extends toward a lower end of the cushion main body 110. That is, the mounting tab portion 122 may be disposed to extend in a direction opposite to the strap portion 121.

The mounting tab portion 122 may be provided with a coupling ring 123 to be fitted onto the ramp 200 at the other end portion thereof. The airbag cushion 100 may be coupled to the ramp 200 through the coupling ring 123.

The coupling ring 123 may form a closed loop having a roughly slit-shaped structure. The coupling ring 123 may extend in a direction orthogonal to an extension direction of the mounting tab portion 122. For example, the mounting tab portion 122 may extend in a vertical direction, and the coupling ring 123 may extend in a left-right direction at the end portion of the mounting tab portion 122.

In the embodiment, the strap portion 121 and the mounting tab portion 122 may be integrally joined to the cushion main body 110 through sewing. However, a method of joining the strap portion 121 and the mounting tab portion 122 is not limited thereto.

In a state in which the cushion main body 110 is folded in a roll shape, the strap portion 121 may wrap around a circumference of the roll-folded cushion main body 110, and the mounting tab portion 122 may be inserted into the opening 121*a* of the strap portion 121 to extend or pass through the opening 121*a* and tightened, and thus the tab strap 120 may firmly bind the cushion main body 110. Accordingly, the cushion main body 110 may maintain a folded state in a roll shape.

The ramp 200 may be mounted on and fixed to, using a fastening member B, the roof rail of the vehicle. In the embodiment, the fastening member B may include a screw or a bolt.

The airbag cushion 100 may be placed, supported, and fixed on the ramp 200, and may be installed on a vehicle body through the ramp 200. In this case, the fastening member B is engaged with or coupled to a coupling hole 221 formed in the ramp 200, without being connected to the airbag cushion 100, so as to fix the ramp 200 to the roof rail. That is, the fastening member B may not be physically coupled to the airbag cushion 100 but may be physically coupled only to the ramp 200 and thus may directly fix only the ramp 200 to the vehicle body.

Figure 5:
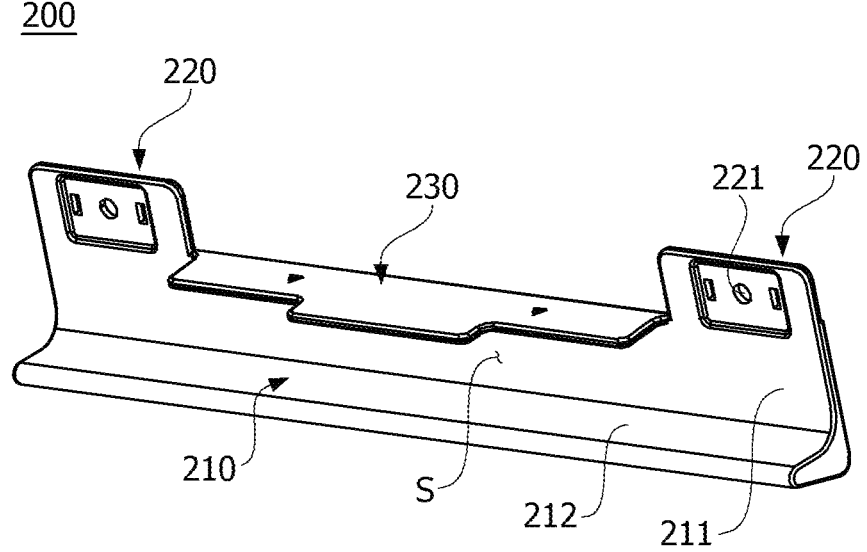
FIG. 5 is a view showing the ramp in the curtain airbag device.
Figure 6:
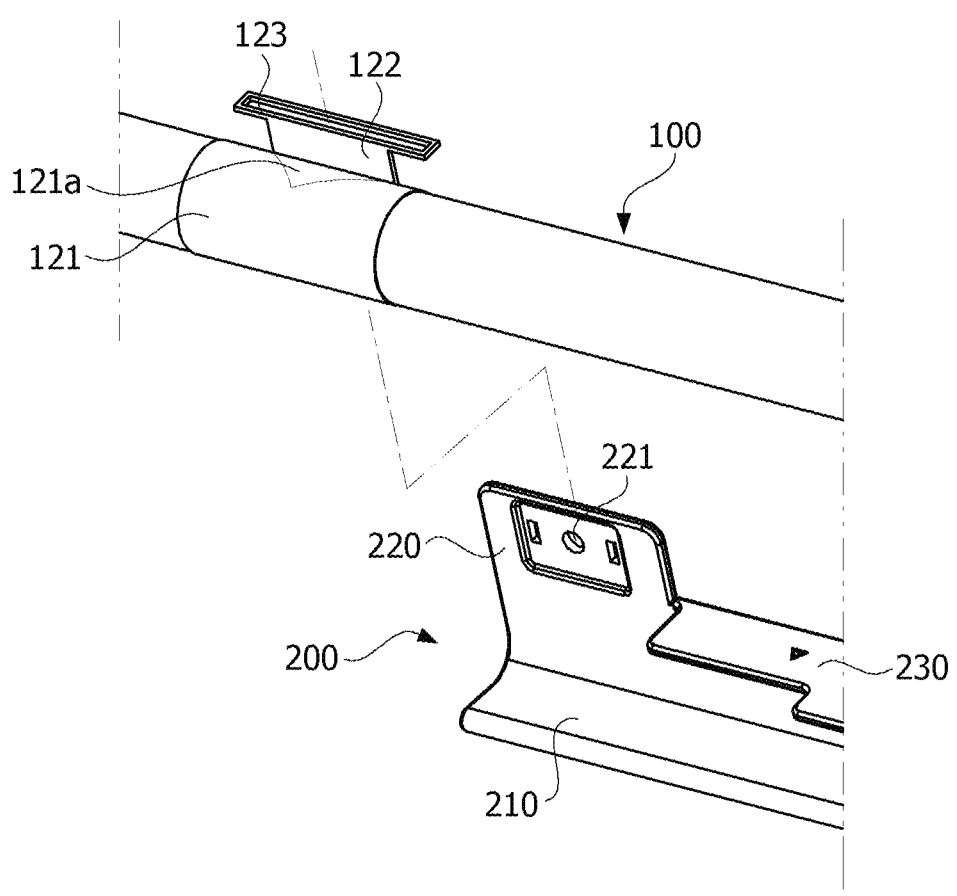
FIG. 6 is a view showing a coupling ring of the tab strap and a fixing portion of the ramp coupled to the coupling ring.

Referring to FIGS. 5 and 6 along with FIG. 2, the ramp 200 may include a support portion 210 on which the airbag cushion 100 is placed and a fixing portion 220 that extends upward from an upper end of the support portion 210. Additionally, the ramp 200 may further include a cover portion 230.

The ramp 200 may have a structure in which the support portion 210, the fixing portion 220, and the cover portion 230 are integrally formed. In the embodiment, the ramp 200 may be made of a rigid plastic, but the material of the ramp 200 is not limited thereto.

The support portion 210 may include a first part 211 that is continuously connected to the fixing portion 220 and extends vertically, and a second part 212 that extends forward from a lower end of the first part 211. The support portion 210 may have an overall "L"-shaped cross-sectional structure.

The fixing portion 220 may be provided as at least a pair fixing portions. The fixing portion 220 may have an overall flat rectangular plate structure, may be provided on each of opposite edges of the first part 211 in a longitudinal direction, and may extend upward. The coupling hole 221 may be formed to extend or pass through the fixing portion 220.

The fixing portion 220 is inserted to extend or pass through the coupling ring 123 and coupled to the mounting tab portion 122. Accordingly, the airbag cushion 100 may be fixed to the ramp 200 by fitting the tab strap 120 to the fixing portion 220 through the coupling ring 123 in a state in which the roll-folded cushion main body 110 is placed and supported on the support portion 210.

The coupling hole 221 may be located above the coupling ring 123 to be spaced apart from the coupling ring 123 in a state in which the fixing portion 220 is inserted into the coupling ring 123. Therefore, the fastening member B may only be fastened to the fixing portion 220 above the coupling ring 123. In addition, the fastening member B may restrain the tab strap 120 fitted to the fixing portion 220 such that the tab strap 120 does not slip out of an upper portion of the fixing portion 220.

The cover portion 230 may be disposed to cover an upper portion of the airbag cushion 100 in a state in which the airbag cushion 100 is placed on the support portion 210. The cover portion 230 extends forward from the upper end of the support portion 210 and accommodates the airbag cushion 100 between the cover portion 230 and the support portion 210. Specifically, the cover portion 230 may extend forward between the pair of fixing portions 220 and form an internal space S having roughly a "U" shape together with the first part 211 and the second part 212 of the support portion 210. The roll-folded cushion main body 110 may be accommodated in the internal space S.

Meanwhile, a fixing strap 300 that integrally wraps around the ramp 200 and the airbag cushion 100 in a state in which the airbag cushion 100 is disposed in the ramp 200 may be further included.

The fixing strap 300 may prevent movement of the airbag cushion 100 placed on the ramp 200 and separation of the airbag cushion 100 from the ramp 200 during a process of fixing the ramp 200 to the vehicle body.

In the embodiment, the fixing strap 300 may include an adhesive tape, which allows the airbag cushion 100 and the ramp 200 to be simultaneously bound together through the adhesive.

The fixing strap 300 may be configured to break when the airbag cushion 100 is deployed. For this purpose, the fixing strap 300 may be made of a material that breaks easily or may be provided with a tear line 310 for breaking.

In the embodiment, the fixing strap 300 may be provided as a plurality of fixing straps, that is, at least two fixing straps. However, the number of fixing straps 300 is not limited, and two or more may be provided.

Figure 7:
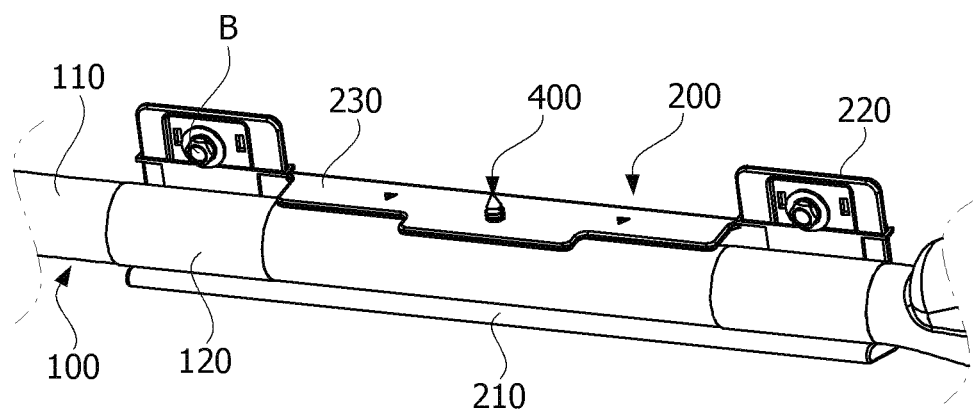
FIG. 7 is a view showing a curtain airbag device in which an airbag cushion and a ramp are bound according to another embodiment.
Figure 8:
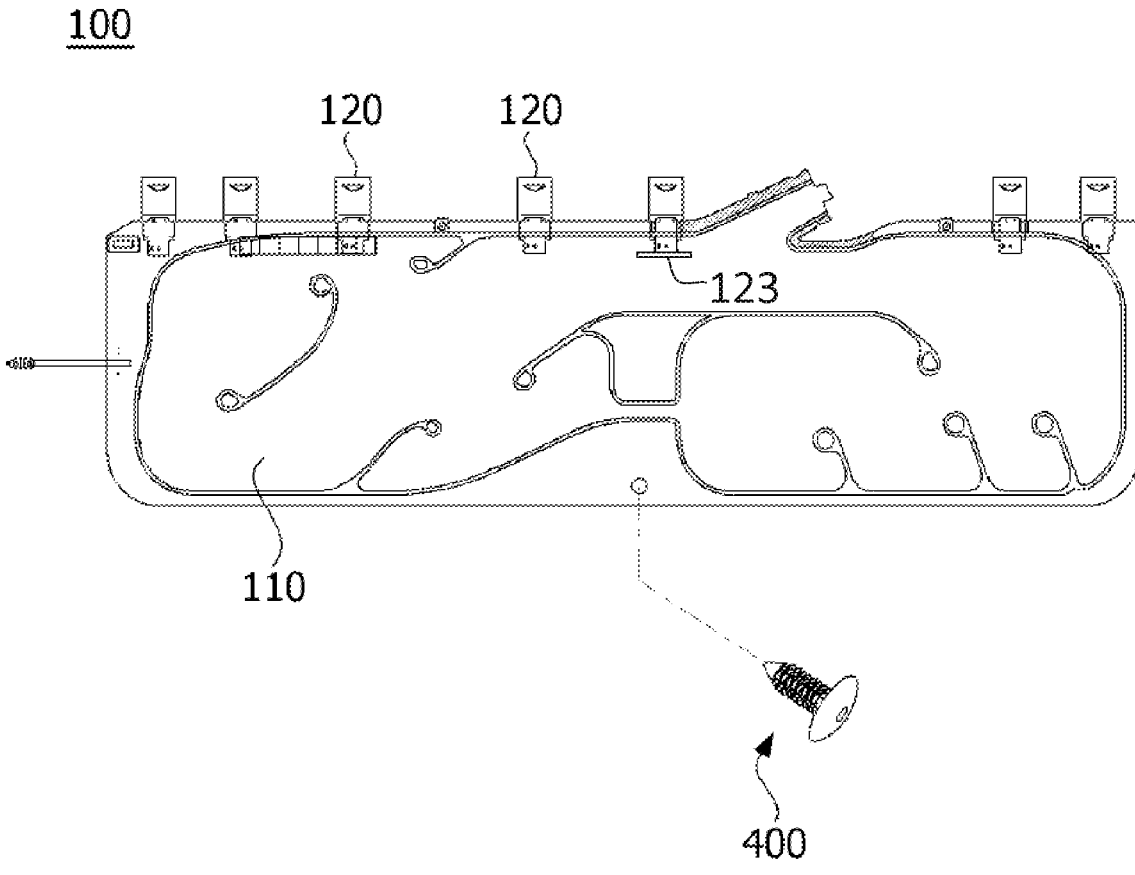
FIG. 8 is a view showing the airbag cushion and a fixing pin in FIG. 7.

Meanwhile, as shown in FIGS. 7 and 8, a fixing pin 400 that fixes the airbag cushion 100 to the cover portion 230 of the ramp 200 in a state in which the airbag cushion 100 is disposed in the ramp 200 may be further included.

The fixing pin 400 may be provided as a structure dependent on the cushion main body 110 and include a push pin.

The fixing pin 400 may be coupled to an inactive area of the cushion main body 110 which is not inflated by the gas and inserted into the cover portion 230 in a state in which the airbag cushion 100 is placed on the support portion 210 to prevent movement of the airbag cushion 100. Additionally, the fixing pin 400 may fix a position of the airbag cushion 100.

In the embodiment, the fixing pin 400 may be provided together with the fixing strap 300 or the fixing pin 400 may be provided alone without the fixing strap 300.

In this way, the curtain airbag device 1 according to the embodiment of the present invention is configured such that the ramp 200 is firmly fixed to the vehicle body through the fastening member B and the airbag cushion 100 is connected to the ramp 200 in a free state in which the coupling ring 123 is fitted onto the fixing portion 220 of the ramp 200.

Accordingly, even when the ramp 200 is coupled to the vehicle body through the fastening member B, the tab strap 120 does not sag due to the load of the airbag cushion 100, and even when an external force is applied, deformation or tearing does not occur.

In addition, when the airbag cushion 100 is deployed, the tab strap 120 freely connected to the fixing portion 220 does not tear or break, and the coupling ring 123 is not detached from the upper portion of the fixing portion 220 by the fastening member B and is blocked downward from the fixing portion 220 by the support portion 210, and thus the tab strap 120 remains connected to the fixing portion 220.

In particular, since the fastening member B and the tab strap 120 are configured not to be physically coupled, a strong force generated when the airbag cushion 100 is deployed, i.e., a deployment force, is not transmitted to the fastening member B. Accordingly, problems that occur in a structure in which the deployment force is transmitted to the fastening member B as in the related art, that is, damaging the fixing portion 220 of the ramp 200 while the fastening member B is separated and fragments flying due to the damage to the fixing portion 220, may be prevented.

According to embodiments of the present invention, a curtain airbag device of which deformation can be prevented and assembly efficiency can be improved by improving a mounting structure of a curtain airbag can be provided.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A curtain airbag device comprising:
an airbag cushion comprising a cushion main body and a tab strap which wraps around the cushion main body and binds the cushion main body to maintain a folded shape; and
a ramp mounted on and fixed to, using a fastening member, a roof rail of a vehicle, wherein the airbag cushion is placed and supported on the ramp,
wherein the ramp has a coupling hole, and the fastening member is engaged with the coupling hole to fix the ramp to the roof rail;
wherein the tab strap includes a strap portion that wraps around the cushion main body folded in a roll shape and a mounting tab portion that extends through the strap portion and is connected to the ramp; and
wherein the mounting tab portion is provided with a coupling ring configured to be fitted onto the ramp at an end portion of the ramp.

2. The curtain airbag device of claim 1, wherein, at an upper end of the cushion main body, the mounting tab portion extends toward a lower end of the cushion main body, and the strap portion extends in a direction opposite to the mounting tab portion.

3. The curtain airbag device of claim 1, wherein:
the strap portion has an opening, and
the mounting tab portion extends through the opening and is tightened such that the tab strap binds the cushion main body.

4. The curtain airbag device of claim 1, wherein:
the ramp includes a support portion on which the airbag cushion is placed and a fixing portion that extends upward from an upper end of the support portion, and
the fixing portion extends through the coupling ring and is coupled to the mounting tab portion.

5. The curtain airbag device of claim 4, wherein:
the coupling hole extends through the fixing portion, and
the coupling hole is disposed above the coupling ring in a state in which the fixing portion is inserted into the coupling ring.

6. The curtain airbag device of claim 4, wherein:
the support portion includes a first part connected to the fixing portion and extending vertically, and a second part extending from a lower end of the first part, and
the fixing portion is provided on each of opposite edges of the first part.

7. The curtain airbag device of claim 4, wherein the ramp further includes a cover portion disposed on the airbag cushion in a state in which the airbag cushion is placed on the support portion.

8. The curtain airbag device of claim 7, wherein the cover portion extends from the upper end of the support portion and accommodates the airbag cushion between the cover portion and the support portion.

9. The curtain airbag device of claim 1, further comprising a fixing strap that wraps around the ramp and the airbag cushion in a state in which the airbag cushion is disposed in the ramp,
wherein the fixing strap is configured to break when the airbag cushion is deployed.

*    *    *    *    *